United States Patent
Mullins et al.

(10) Patent No.: US 7,133,377 B1
(45) Date of Patent: Nov. 7, 2006

(54) DATA MULTIPLEXING FOR DIVERSITY OPERATION

(75) Inventors: Dennis Roy Mullins, London (GB); Mark Grayson, London (GB)

(73) Assignee: ICO Services, Ltd., London (GB)

( * ) Notice: Subject to any disclaimer, the term of this patent is extended or adjusted under 35 U.S.C. 154(b) by 0 days.

(21) Appl. No.: 09/959,815

(22) PCT Filed: May 17, 2000

(86) PCT No.: PCT/GB00/01880

§ 371 (c)(1),
(2), (4) Date: Feb. 28, 2002

(87) PCT Pub. No.: WO00/72467

PCT Pub. Date: Nov. 30, 2000

(30) Foreign Application Priority Data

May 24, 1999 (EP) .................................. 99303987

(51) Int. Cl.
*H04B 7/212* (2006.01)
*H04J 3/08* (2006.01)

(52) U.S. Cl. .................. 370/321; 370/326; 370/442

(58) Field of Classification Search .................... None
See application file for complete search history.

(56) References Cited

U.S. PATENT DOCUMENTS

| | | | |
|---|---|---|---|
| 5,394,561 A | | 2/1995 | Freeburg |
| 6,035,209 A | * | 3/2000 | Tiedemann et al. .......... 455/522 |
| 6,138,012 A | * | 10/2000 | Krutz et al. ................. 455/427 |
| 6,788,917 B1 | * | 9/2004 | Refai et al. ................. 455/12.1 |
| 2004/0170148 A1 | * | 9/2004 | Parkkinen et al. .......... 370/337 |

FOREIGN PATENT DOCUMENTS

| | | |
|---|---|---|
| EP | 0365885 A2 | 5/1990 |
| EP | 0837568 A2 | 10/1996 |
| EP | 0869628 A1 | 4/1997 |
| GB | 2288913 A | 11/1995 |
| GB | 2293725 A | 4/1996 |
| GB | 2295296 A | 5/1996 |
| WO | WO 9621987 | 7/1996 |
| WO | WO 9809391 | 3/1998 |

OTHER PUBLICATIONS

John V. Evans, "New Satellites for Personal Communications", Scientific American, Apr. 1998, pp. 60-67.

* cited by examiner

*Primary Examiner*—Huy D. Vu
*Assistant Examiner*—Daniel J. Ryman
(74) *Attorney, Agent, or Firm*—Michael J. Donohue; Davis Wright Tremaine LLP

(57) ABSTRACT

In a satellite mobile telecommunications system based on the GSM standard, and using a TDMA frame structure, discontinuous transmission (DTX) mode is used to take advantage of the substantial silences which occur during normal speech. In this mode, traffic channel (TCH) data is not sent, but control of the link between a ground station and a user terminal is maintained by sending control channel data bursts (SACCH) together with silence descriptor (SID) frames. To avoid high peak to mean values of transmission power at the satellite, the emission time of the bursts is controlled so as to be uniform over the available sending opportunities. Conventional techniques for doing this cannot be used in a system which includes diversity operation. Therefore, the burst transmission time at the ground station is set in dependence on a reference provided by the user terminal which is a modified version of the reference generated for contention resolution of random access requests.

33 Claims, 12 Drawing Sheets

At UT 1

At SBS 1

DATA MULTIPLEXING FOR DIVERSITY OPERATION

FIELD OF THE INVENTION

This invention relates to data multiplexing in a mobile telecommunications system, such as a satellite telecommunications system, which includes diversity operation, with particular but not exclusive application to mutiplexing of link control data in a system which includes dicontinuous transmission over diverse communication paths.

BACKGROUND

Terrestrial mobile telecommunications systems are well known and a number of different systems have developed which operate according to different standards, both analog and digital. In Europe and the Far East, excluding Japan, and elsewhere, the digital Global System Mobile (GSM) network has become popular, whereas in the USA, networks which operate according to the IS-41 recommendations such as the Advanced Mobile Phone System (AMPS) and the Digital Advanced Mobile Phone System (DAMPS) are used. In Japan, the Personal Handiphone System (PHS) and the Personal Digital Communication (PDC) network are in use. More recently, proposals have been made for a Universal Mobile Telecommunications System (UMTS). These networks are all cellular and land-based but have differences in architecture and use different signalling protocols and transmission frequency bands.

Mobile telecommunication systems have been proposed that use satellite communication links between mobile user terminals and conventional terrestrial networks such as public switched telephone networks (PSTNs) and public land mobile networks (PLMNs). One network known as the IRIDIUM™ satellite cellular system is described in EP-A-0365885 and U.S. Pat. No. 5,394,561 (Motorola), which makes use of a constellation of so-called low earth orbit (LEO) satellites, that have an orbital radius of 780 km. Mobile user terminals such as telephone handsets establish a link to an overhead orbiting satellite, from which a call can be directed to another satellite in the constellation and then typically to a ground station which is connected to conventional land-based networks.

Alternative schemes which make use of so-called medium earth orbit (MEO) satellite constellations have been proposed, with an orbital radius in the range of 10–20,000 km. Reference is directed to the ICO™ satellite cellular system described for example in GB-A-2 295 296. With this system, the satellite communications link does not permit communication between adjacent satellites. Instead, a signal from a mobile user terminal such as a mobile handset is directed firstly to the satellite and then directed to a ground station or satellite access node (SAN), connected to conventional land-based telephone networks. This has the advantage that many components of the system are compatible with known digital terrestrial cellular technology such as GSM. Also simpler satellite communication techniques can be used than with a LEO network. Reference is directed to "New Satellites for Personal Communications", Scientific American, April 1998, pp. 60–67, for an overview of LEO/MEO satellite networks.

Conventional GSM-based systems use a scheme based on a combination of time and frequency division multiple access to provide communication channels. The available bandwidth is divided into a number of carrier frequencies, each of which is further divided using a TDMA scheme. Speech and data are carried by a number of traffic channels (TCH).

To allow signalling messages to be conveyed along with the user data, each traffic channel is associated with a low rate channel, known as the Slow Association Control Channel (SACCH). This is used mainly for link maintenance and control procedures, such as transmission power control, timing advance control and the transmission of information relating to measurement reporting procedures to be performed by the user terminal.

The TDMA frame structure for TCH/SACCH channels according to the GSM Specifications is shown in FIG. 1. The basic unit of transmission is a series of about 100 modulated bits which is referred to as a burst. Bursts are sent in time and frequency windows which are referred to as slots. The duration of a slot is referred to as a burst period or BP and in the GSM system lasts 15/26 ms (approximately 0.577 ms). Eight burst periods are grouped into a TDMA frame, which lasts 120/26 ms (approximately 4.615 ms). Each traffic channel is based on one burst period per frame, so that eight TCH channels can be accommodated per frame. In a 26 frame multiframe, which lasts 120 ms, frames 0 to 11 and 13 to 24 each carry 8 channels of TCH data, while frame 12 carries SACCH data, each SACCH burst period providing the necessary signalling for one TCH channel. Frame 25 is unused. A complete SACCH message or block is distributed over four multiframes i.e. 480 ms so that 2 SACCH blocks are sent approximately every second.

Each time slot is associated with a unique number referred to as the Absolute Time Slot Number (ATN). For a 26 frame multiframe with 8 slots per frame, this runs from, for example, 0 to 207. The GSM specifications define the time slot number (TN) of a particular channel as the ATN mode 8, i.e. the remainder when the absolute time slot number is divided by the number of slots per frame. This is a number in the range 0 to 7 specific to a TCH channel. For example, ATN 22 (starting with slot number 0) lies in frames 3 and represents a TCH channel with TN=6.

The efficiency of a GSM system is increased by operating in discontinuous transmission mode (DTX), which reflects the fact that a user only speaks for a proportion of the time during normal conversation. During DTX operation, the traffic channel TCH is not seen. However, signalling is still required to maintain and control the link, so that the SACCH is still transmitted, together with frames known as Silence Descriptor (SID) frames. The purpose of SID frames is to transfer the characteristics of the background noise at the transmitter to the receiver. This feature aims to overcome the disturbance to the listener which has otherwise been shown to result from the sudden disappearance of background noise when the speaker stops speaking.

During DTX mode, to avoid an uneven load on the basis station transmitter, with all SACCHs being transmitted at frame 12, the emission time for the SACCH bursts can be spread evenly over the empty frames. This can be achieved by mutliplexing the SACCH burst according to the time slot number TN allocated to a particular channel. For example, for the frame structure described above, the SACCH burst can be transmitted on (ATN div 8=0) for TN=0, (ATN div 8=1) for TN=1, and so on, where a div b is the quotient when a is divided by b. Therefore, the SACCH burst associated with TCH channel 0 is emitted in frame 0, and that associated with channel 2 in frame 2, as shown in FIG. 2. Therefore, a single SACCH burst and a single SID burst are sent in each of frames 0 to 7 and nothing is emitted in any of the other frames. This scheme does not constrain the complete SACCH emission to take place during this frame number. For example, the SACCH may be multiplexed over, for example, eight frames beginning at a specified frame number.

In a satellite system, the satellite constellation can be configured so that for any location of user terminal on the earth, more than one satellite is at an elevation of more than 10 degrees above the horizon and hence two satellites are usually available for communication concurrently with the user terminal. The availability of more than one satellite permits so-called diversity operation which a traffic channel can be transmitted between the ground and the user terminal concurrently via two satellites, in two paths, to mitigate effects of blockage and fading. Diversity operation is described in GB-A-2 293 725 and EP-A-0 837 568.

In systems which support diversity operation, the separate physical paths for transmission make up a single logical path, so that the emissions on the diversity paths must correspond to identical encoded data. For dual path diversity, the user terminal is designed to receive two bursts per frame, for example a burst from a first satellite in time slot TN=0 and a burst from a second satellite at time slot TN=4. Since the time slot number TN will be different for the two diversity paths, multiplexing of the SACCH emissions cannot be based on the time slot number TN, since the SACCH data would not then arrive at the user terminal within the same frame. For example, using the TN based multiplexing scheme explained above, the SACCH burst from the second satellite would arrive at the user terminal 4 frames after the burst from the first satellite, so introducing significant delays in processing the SACCH signals.

In addition, a TN based multiplexing scheme can impair the ability of the system to use the time alignment of the SACCH frames as a unique reference for functions such as measurement reporting and burst alignment in DTC operation. It can also facilitate attacks on the encryption scheme in systems where data is different frames is encrypted using different encryption keys.

SUMMARY OF THE INVENTION

The present invention aims to overcome the above problems.

According to the present invention, there is provided a method of data multiplexing in a mobile telecommunications system in which a ground station is in communication with each of a plurality of user terminals via a respective logical channel, each logical channel capable of carrying link control data to a respective user terminal over diverse communication paths using a multiple access scheme which includes time division, in which a frame comprises a sequence of data bursts, each burst being associated with a logical channel, the method comprising for each channel, setting the data burst transmission time from the ground station such that data bursts carrying link control data relating to the same channel and travelling over diverse paths to the same user terminal, arrive at the user terminal within a predetermined number of frames, and distributing the ground station transmission time of data bursts carrying link control data for different channels over a plurality of frames.

In accordance with this method, a user terminal is able to predict the arrival times of link control data for each of the diversity paths. The data burst transmission time can be set so that bursts carrying link control data relating to the same channel and travelling over diverse paths to the same user terminal, arrive at the user terminal within the same frame, so that there is no delay in processing the two identical parts of the link control data. In discontinuous transmission mode, arrival of the link control data from diverse paths in the same frame minimises the number of frames in which data needs to be sent.

Advantageously, the ground station burst transmission time can be set in accordance with transmission control information provided by the user terminal. To avoid the need for additional signalling channels, this information can be part of the random reference used by the ground station for contention resolution of random access requests from a plurality of user terminals. Alternatively, the transmission control information can be generated at the ground station.

Multiplexing the data bursts in accordance with the method of the invention provides a staggering of the data burst transmission times at the ground station, so limiting the peak transmission power required at the ground station. This in turn avoids high peak to mean values of transmission power, i.e. power ripple, at the satellite which, in a satellite system, significantly limits the number of traffic channels capable of being supported.

According to the invention, there is further provided a link control signal for maintaining link control between a user terminal and a ground station in a mobile telecommunications system in which a ground station is in communication with each of a plurality of user terminals via a respective logical channel, each logical channel capable of carrying link control data to a respective user terminal over diverse communication paths using a multiple access scheme which includes time division, in which a frame comprises a sequence of data burst, each burst being associated with a logical channel, the signal being configured such that data bursts carrying link control data relating to the same channel arrive at the user terminal within a predetermined number of frames, and such that data bursts carrying link control data for different channels are distributed over a plurality of frames.

According to the present invention, there is also provided a user terminal for use in a mobile telecommunications system in which a ground station is in communication with each of a plurality of user terminals via a respective logical channel, each logical channel capable of carrying link control data to a respective user terminal other diverse communication paths using a multiple access scheme which includes time division, in which a frame comprises a sequence of data bursts, each burst being associated with a logical channel, the user terminal comprising means for providing transmission control information to the ground station to control the setting of data burst transmission times at the ground station, in dependence on which data burst transmission times are set at the ground station such that data bursts carrying link control data relating to the same channel and travelling over diverse paths to the same user terminal, arrive at the user terminal within a predetermined number of frames, and such that the ground station transmission time of data bursts carrying link control data for different channels is distributed over a plurality of frames.

In addition, the present invention also provides a ground station in a mobile telecommunications system in which the ground station is in communication with each of a plurality of user terminals via a respective logical channel, each logical channel capable of carrying link control data to a respective user terminal over diverse communication paths using a multiple access scheme which includes time division, in which a frame comprises a sequence of data bursts, each burst being associated with a logical channel, the ground station comprising means for setting data burst transmission times in dependence on transmission control information, such that data bursts carrying link control data relating to the same channel and travelling over diverse paths to the same user terminal, arrive at the user terminal within a predetermined number of frames, and such that the ground station transmission time of data bursts carrying link control data for different channels is distributed over a plurality of frames.

The transmission control information can be provided by the user terminal or generated at the ground station.

BRIEF DESCRIPTION OF THE DRAWINGS

Embodiments of the invention will now be described by way of example with reference to the accompanying drawings, in which:

FIG. 8 is a schematic block diagram of the circuits of satellite 3a;

DETAILED DESCRIPTION

Overview of network

Figure 1:
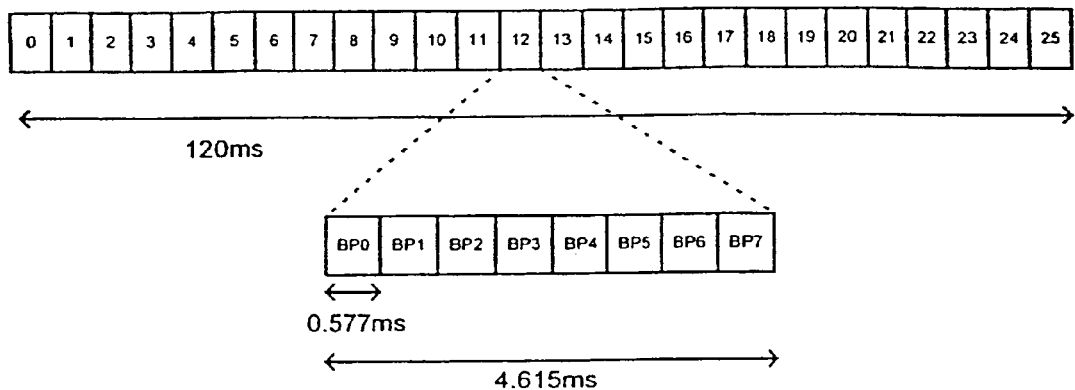
FIG. 1 illustrates a prior art TDMA frame structure for TCH/SACCH channels according to the GSM specification.
Figure 2:
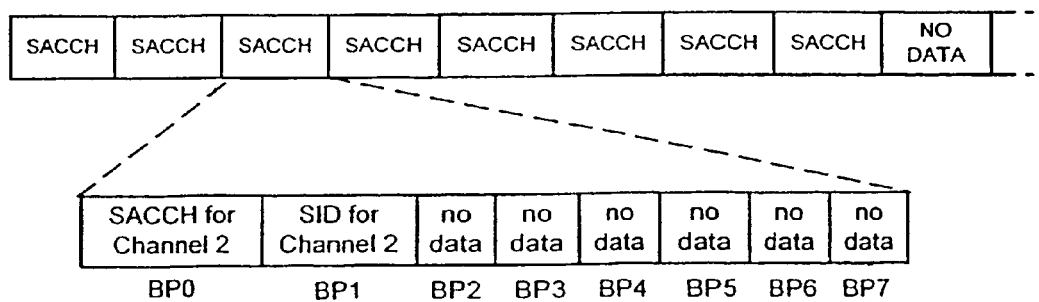
FIG. 2 illustrates a prior art SACCH burst for channel 2 in frame 2.
Figure 3:
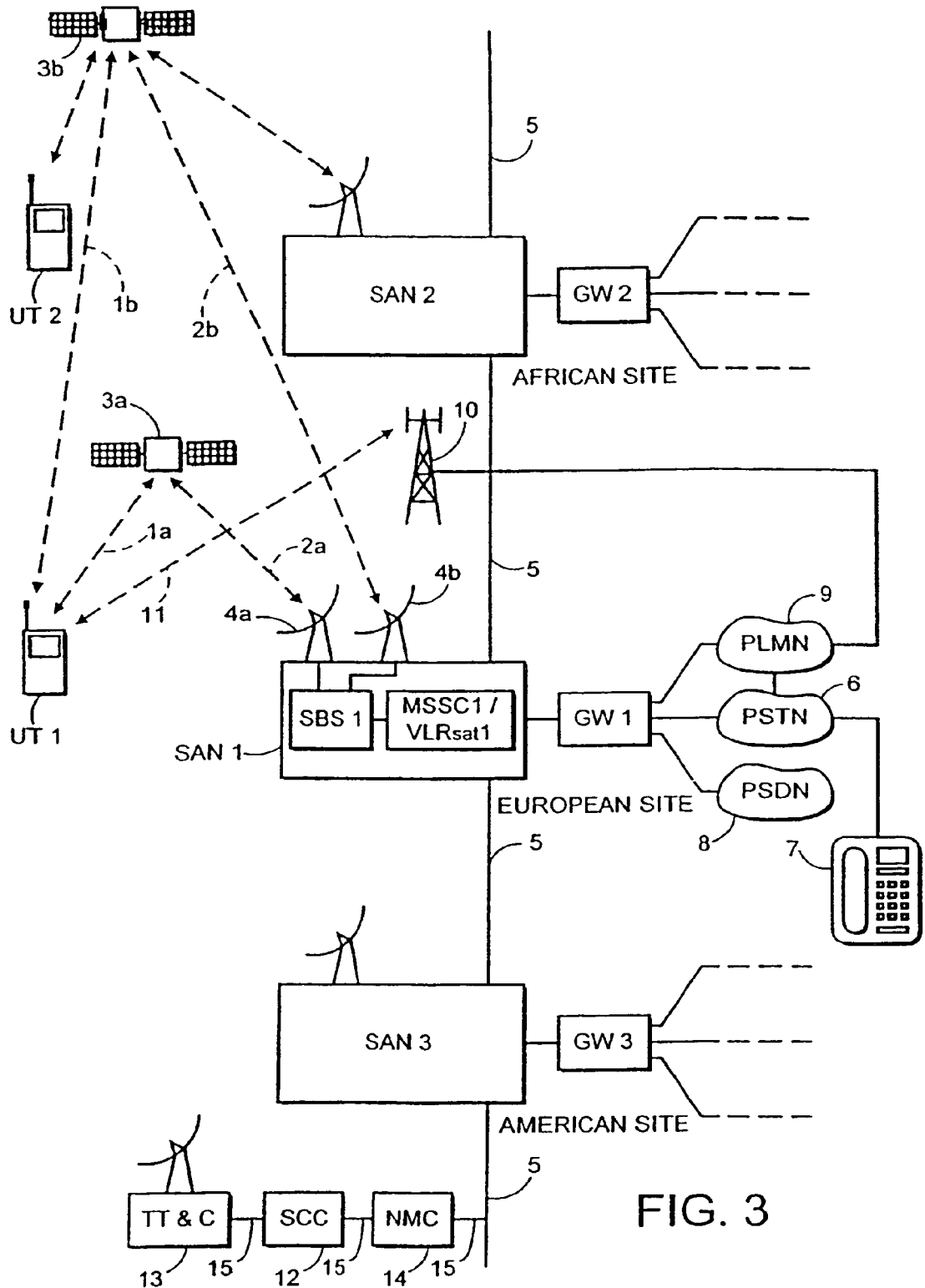
FIG. 3 is a schematic diagram of a satellite telecommunications system together with a local, land-based mobile telecommunications system, in accordance with the invention.

Referring to FIG. 3, a schematic block diagram of a satellite mobile telecommunications network is shown corresponding to the ICO™ network. A mobile user terminal UT 1 in the form of a mobile telephone handset can communicate on a radio channel over a communication path 1a, 2a via an earth orbiting satellite 3a with a land-based satellite access node SAN 1. As shown schematically in FIG. 3, SAN 1 is provided with a dish antenna arrangement that includes antenna 4a which can track the orbiting satellite 3a.

A number of the satellite access nodes SAN 1, 2, 3, etc are connected together to form a backbone network 5, which is connected through a number of gateways GW 1, 2, 3, etc to conventional land-based telephone networks. For example, the gateway GW 1, is connected to a land-based public switched telephone network (PSTN) 6, which permits connection to be made to a conventional telephone set 7. The gateway GW 1 is additionally connected to a public switched data network (PSDN) 8 and a public land mobile network (PLMN) 9. Each of the gateways GW 1, 2, 3 may comprise existing International Switching Centres (ISCs) or mobile switching centres (MSCs) of the type used in GSM mobile networks.

As shown in FIG. 3, the handset UT 1 is a dual mode device which can also communicate with the conventional land-based mobile network PLMN 9, that is shown schematically to include a transceiver station 10 which establishes a duplex link 11 with the user terminal UT 1. In this example, the PLMN 9 is a GSM network. Thus the user can for example roam to the satellite network when out of range of the PLMN 9.

For a fuller understanding of GSM, reference is directed to the various GSM Recommendations issued by the European Telecommunications Institute (ETSI). Also reference is directed to "The GSM System for Mobile Communications" supra, for a more readable overview.

The satellite network is designed to provide world-wide coverage and the satellite 3a forms part of a constellation of satellites, which may be arranged in several orbits. The satellites may be arranged in a MEO constellation, for example with an orbital radius of 10,390 km, although the invention is not restricted to a particular orbital radius. In one example, two orbits of five satellites are used, which can be shown to provide coverage of a major part of the surface of the earth, in which for a 10° satellite elevation angle, one satellite can be accessed by the mobile handset all of the time and two satellites can be accessed for at least 80% of the time, thereby providing more than one concurrent communication path to the user terminal from a particular SAN. Additional satellites may be included in the constellation in order to provide redundancy.

In this embodiment, two satellites 3a, 3b of the constellation are shown in a common orbit and the satellites are tracked by the antenna arrangement 4 of each SAN. The antenna arrangement 4 for each SAN may for example include five dish antennas to track satellites individually, although only two of the dish antennas 4a, 4b for SAN 1 are shown in FIG. 3 and only one dish is shown for the other SANs, in order to simplify the drawing. The dish antennas permit diverse communication paths to be established between the SANs and an individual user terminal via different satellites. In this example, the first communication path 1a, 2a is set up between dish antenna 4a of SAN 1 and user terminal UT 1 via satellite 3a, and a second communication path 1b, 2b is set up between dish antenna 4b of SAN 1 and user terminal UT 1 via satellite 3b, thus providing first and second diverse paths for concurrent communication of signal traffic between the satellite and the user terminal.

The SANs are spaced around the earth in order to provide continuous coverage. In the example shown, SAN 1 may be located in European whereas SAN 2 may be located in Africa, SAN 3 in American and other SANs may be located elsewhere.

SAN 1 consists of a satellite base station SBS 1 which is coupled to the dish antenna arrangement 4 for tracking the satellites, the SBS 1 including transmitter and receiver circuits with amplifiers, multiplexers, de-multiplexers and codecs, which will be described in more detail later. A mobile satellite switching centre MSSC 1 is coupled to SBS 1 and includes a satellite visitor location register VLR$_{SAT}$ 1. MSSC 1 couples communication signals to the backbone network 5 and to the SBS 1, so as to allow individual telephone calls to be established through the backbone network 5 and the duplex communication links 1*a*, 2*a* via the satellite 3*a*, to the mobile terminal UT 1. Also, MSSC 1 is connected to the gateway GW 1 so as to provide a connection to PLMN 9, PSDN 8 and PSTN 6. It will be understood that all the SANs are of similar construction with a respective VLR$_{SAT}$ to maintain a record of the subscribers registered.

In FIG. 3, the SAN 2 is shown communicating with user terminal UT 2 via satellite 3*b*. For further details of the network, reference is directed to GB-A-2 295 296 and EP-A-0869628.

The satellite 3*a*, 3*b* are in non geo-stationary orbits and comprise generally conventional hardware such as the Hughes HS 601. They may include features disclosed in GB-A-2 288 913.

Figure 4:
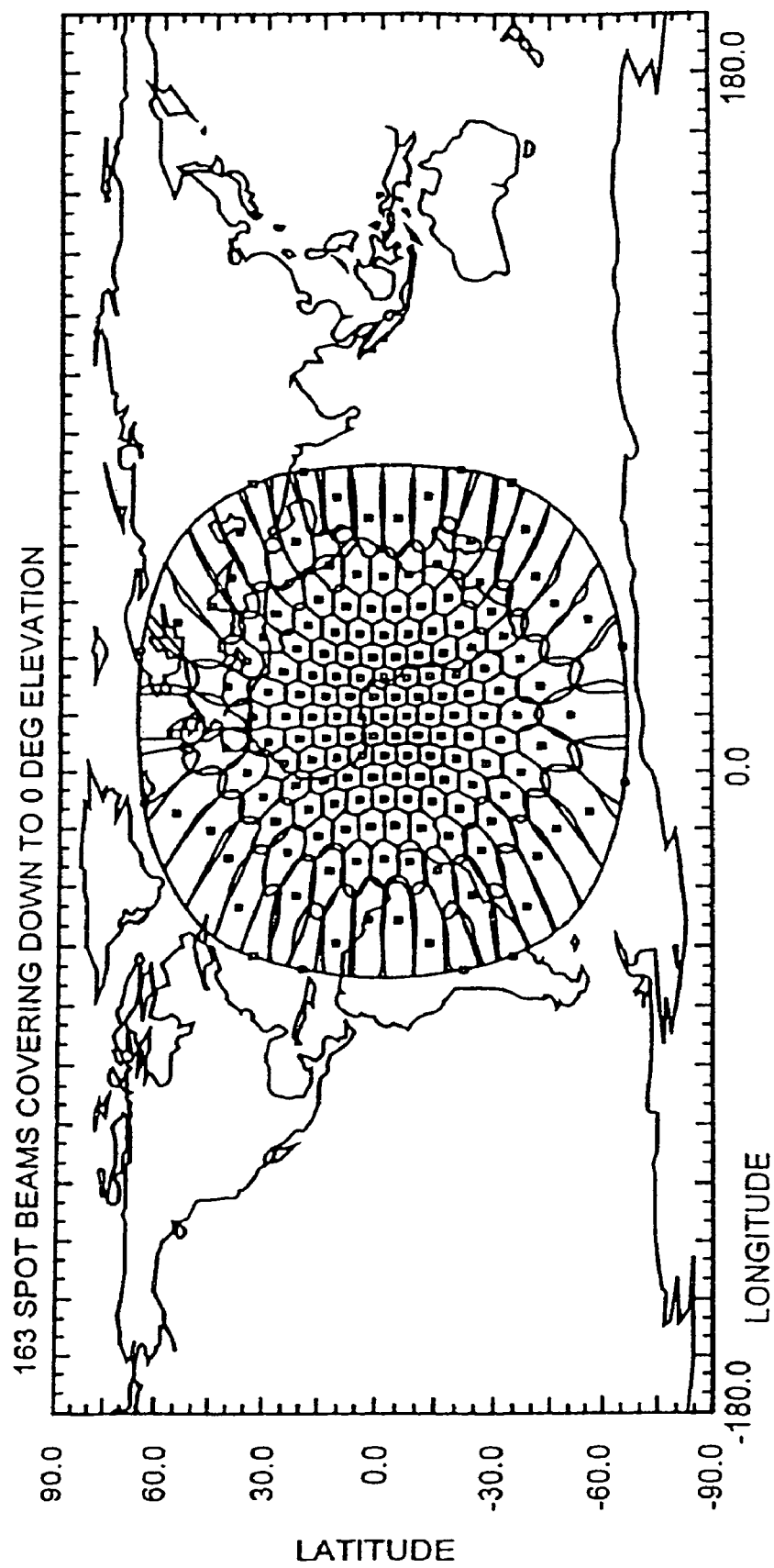
FIG. 4 is a schematic diagram of the spot beam pattern produced by one of the satellites on the earth.
Figure 5:
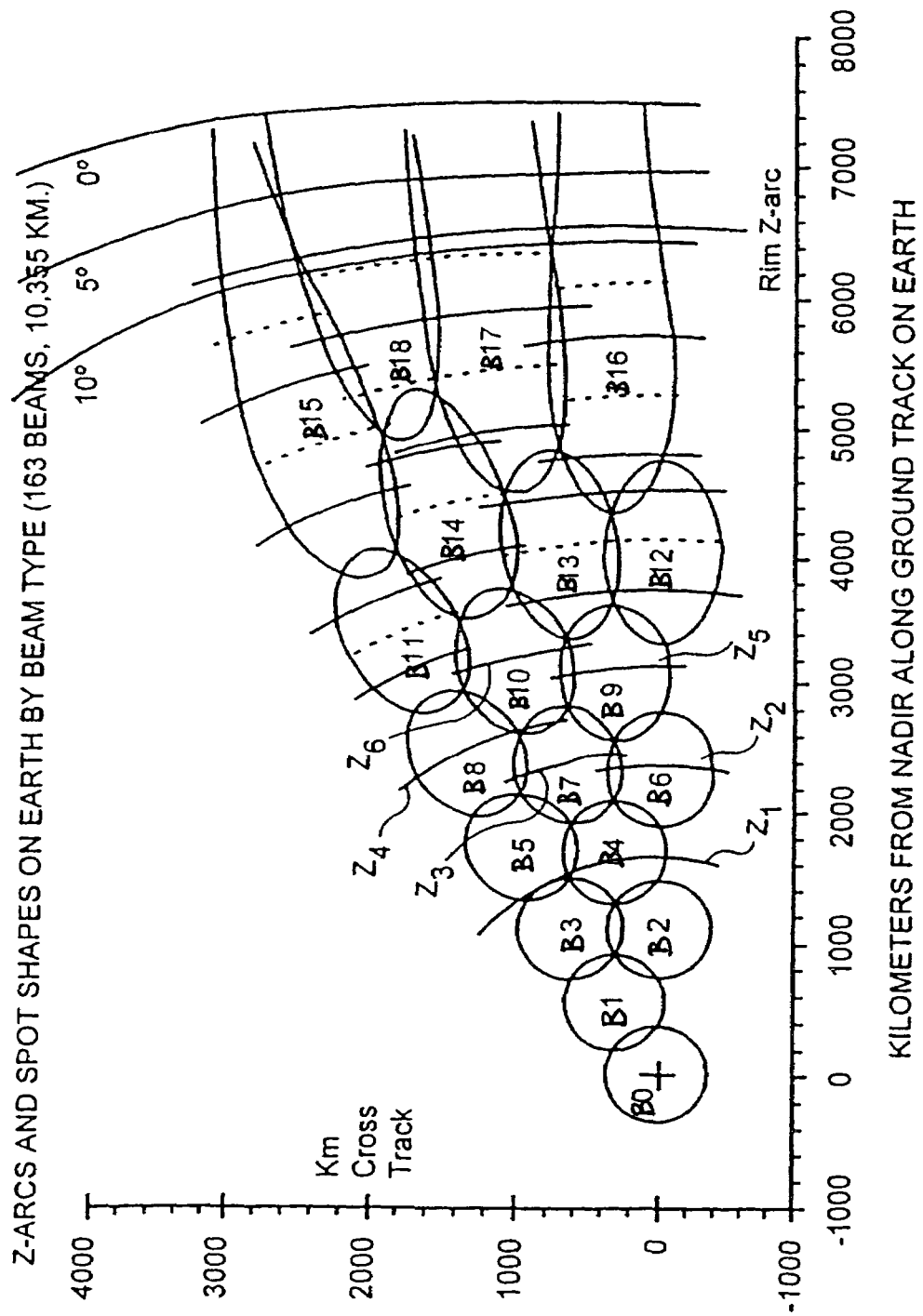
FIG. 5 illustrates schematically different beam types and their associated cellular area and Z-arcs, from the pattern shown in FIG. 4.

Each satellite 3*a*, 3*b* is arranged to generate an array of radio beams each with a footprint on the earth beneath the satellite, each beam including a number of different frequency channels and time slots as described in GB-A-2 293 725. The beams thus provide adjacent cellular areas which correspond to the cells of a conventional land-based mobile telephone network. Referring to FIG. 4, in the ICO™ satellite mobile telephone system, each satellite 3*a*, 3*b* produces a fixed pattern of 163 spot beams, with the shapes of the spot beams, with the shapes of the spot beams varying as a result of the curvature of the earth to produce 19 different beam types (B0–B18), as shown in FIG. 5.

The satellites are controlled by means of a satellite control centre (SCC) 12 and a telemetry tracking and control station (TT&C) 13, which are connected to a network management centre (NMC) 14 through a digital network 15 that is coupled to the backbone network 5. The SCC 12 and the TT&C 13 control operations of the satellites 3*a*, 3*b*, e.g. for setting the general transmission power levels and transponder input turning, as directed by the NMC 14. Telemetry signals for the satellites 3*a*, 3*b* are received by the TT&C 13 and processed by the SCC 12 to ensure that the satellites are functioning correctly.

Channel Configuration

During a telephone call, each of the user terminals communicates with a respective SAN via the satellites. A full duplex communication path is provided between the UT and the SAN. As referred to herein, communication from the SAN to the UT via the satellite is referred to as a "downlink", and communication directed from the UT, via the satellite to the SAN is referred to as an "uplink". As will be explained in more detail hereinafter, the signals may travel over diverse phase paths between UT 1 and SAN 1 via satellite 3*a* or 3*b* or both of them concurrently.

Figure 6:
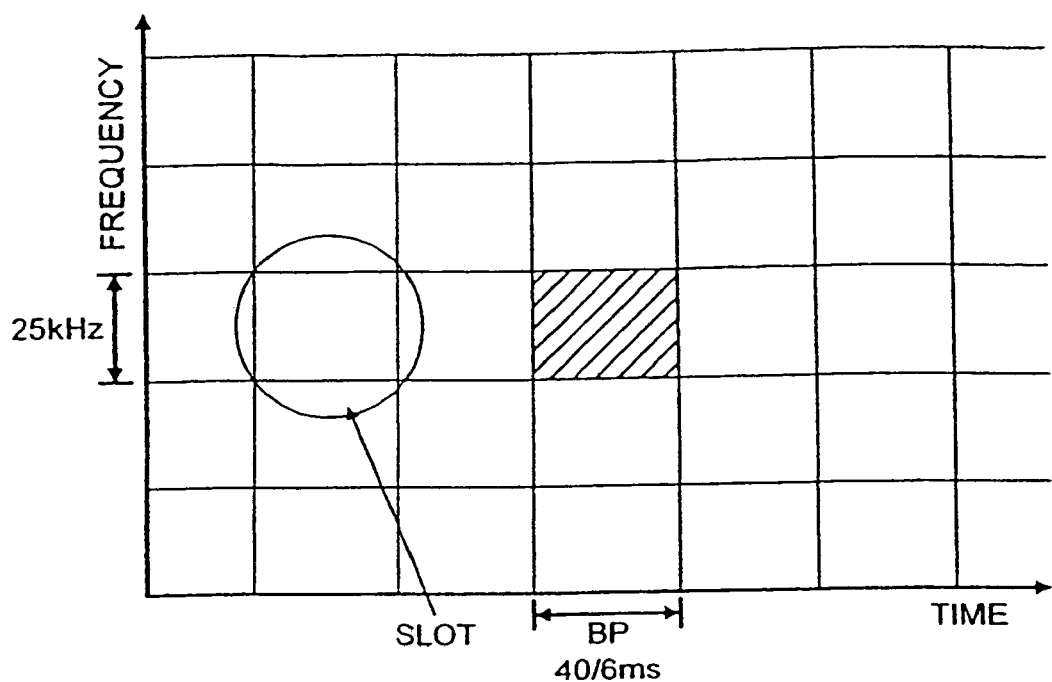
FIG. 6 is a schematic frequency/time diagram illustrating time slots for the frequency diverse TDMA transmission scheme.

The general configuration of the transmitted signals is similar in some respects to those used for conventional GSM transmission in a PLMN and makes use of a frequency diverse time division multiple access (TDMA) scheme. For speech transmission, data is sent on a traffic channel TCH. Each TCH is provided with an associated slow-rate control channel or SACCH. The configuration of these channels in the TDMA schemes will now be described in more detail. The basic unit of transmission between the SAN and UT is a series of about 120 modulated symbols, which is referred to as a burst. Bursts each have a finite duration and occupy a finite part of the radio spectrum. Thus, they are sent in time and frequency windows which are referred to as slots. The slots are positioned e.g. every 25 kHz and recur in time every 40/6 ms (6.67 ms). The duration of each slot is referred to as a burst period or BP. A graphical representation of a slot in the time and frequency domain is shown in FIG. 6.

Figure 7:
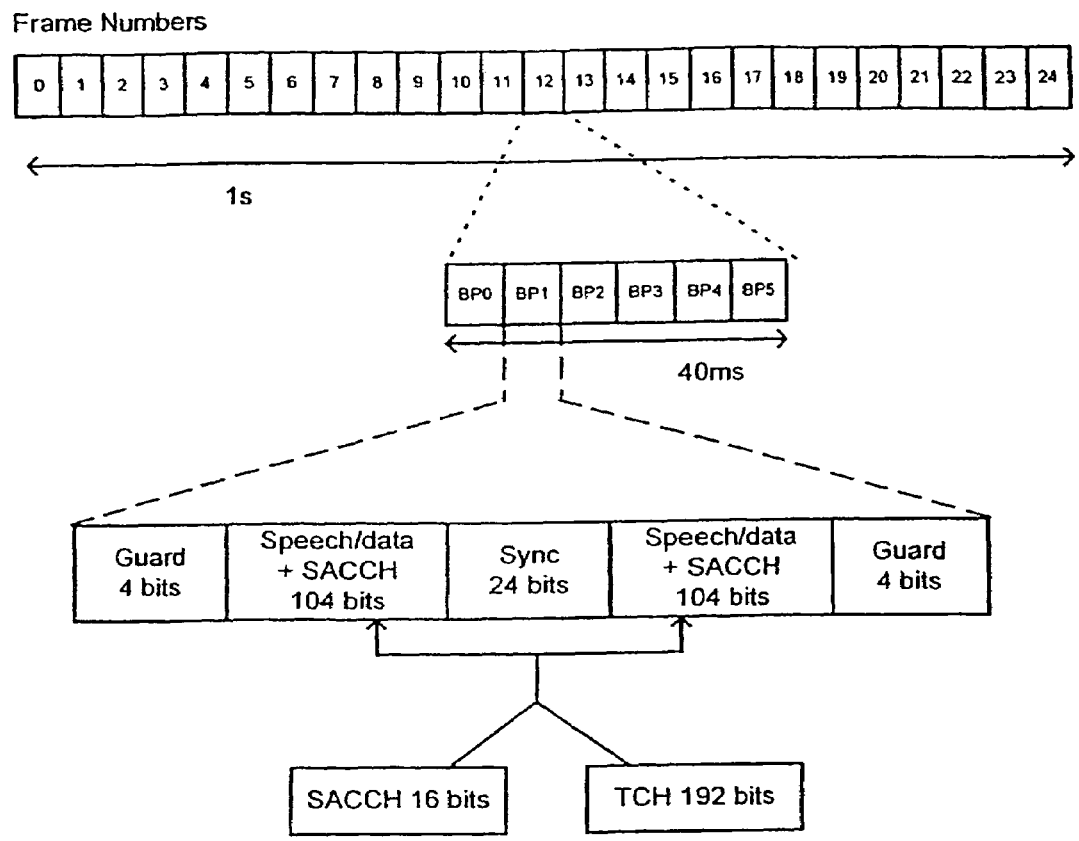
FIG. 7 is a schematic diagram showing the TCH/SACCH burst formatting.

Referring to FIG. 7, each TCH consists of one slot every frame (6 BP) and comprises a cycle of 25 slots over a 25 frame multiframe. The SACCH is multiplexed over 12 consecutive slots, with, for example, 16 bits of SACCH data per slot. Two SACCH blocks are transmitted for every 25 slot cycle, i.e. two blocks per second. One slot in the 25 slot cycle therefore contains no SACCH data, but only TCH data with an extended number of sync bits.

It will be appreciated that with this configuration, 6 TCHs can be interleaved due to the fact that each TCH consists of a slot every 6 BP. The resulting interleaved structure thus provides a 40 ms frame of 6 TCHs every 6 BP.

In addition to the channels TCH/SACCH for the individual UTs, a number of common control channels are defined generally based on a 25 time slot TDMA structure. A downlink broadcast control channel BCCH is broadcast from each satellite to all UTs within a particular cell. The BOCH provides information which identifies the cell to the UT, which is received by the UT in idle mode i.e. when no call is being made. As each cell has its own BCCH, the relative signal strengths of the BCCHs at the UT can be used to determine which cell is to be used for TCH/SACCH communication with the UT. Other system information may be transmitted to the UTs of a particular cell in the BCCH in a similar manner to GSM. The BCCH message consists of, for example, one burst every 25 BP.

A common downlink paging logical channel PCH is provided for each cell. This is used to transmit paging messages to a UT, for example a call announcement message to alert the UT to an incoming call. Also an access grant logical channel AGCH indicates to the UT a channel allocated by the network, to be used by the UT for speech or data communication (TCH/SACCH). The PCH may consist of 1 to 10 slots every 25 BP and the AGCH may consist of e.g. 2, 4, 6, 8, 10 or 12 slots every 25 BP.

In addition to these downlink common channels, there is an uplink common channel which allows UTs within a cell to transmit channel access requests to the network, when it is desired to make a call from the UT or in response to a call announcement message on the PCH channel. These requests thus occur essentially randomly in time and the channel is accordingly called the random access channel RACH. The RACH consists of e.g. 2 slots every 3, 4 or 5 BP.

The SAN 1 to satellite 3*a*, 3*b* uplinks are located in a frequency band in the region of 5 GHz and the corresponding downlinks are in the region of 7 GHz. The satellite 3*a*, 3*b* to UT 1 downlinks are in the region of 2.1 GHz and the corresponding uplinks are in the region of 1.9 GHz, although the invention is not restricted to these frequencies. In this example, the individual TCH/SACCHs and BCCHs are assigned constant individual 25 KHz wide frequency bands to provide a TDMA slot sequence as explained with reference to FIGS. 6 and 7.

Satellite

Figure 8:
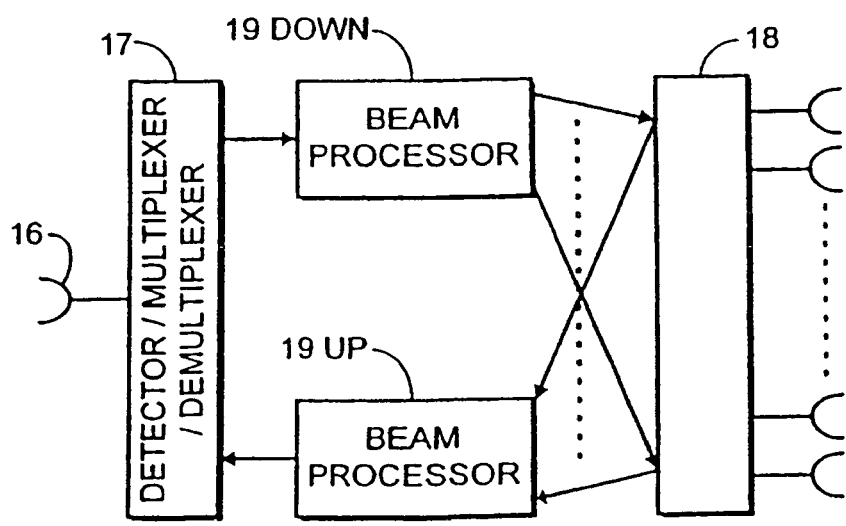

A schematic diagram of the major signal processing components of each satellite is given in FIG. 8. Signals transmitted from one of the SANs are received by antenna 16 and directed to a detector/multiplexer/de-multiplexer circuit 17. It will be understood that the signal transmitted form the SAN to the satellite contains a large number of TCH/SACCHs that are to be directed to individual UTs by the satellite. To this end, the satellite includes an array 18 of a plurality (for example 163) of antennas that produce individual spot beams that correspond to a cellular configuration as previously described. A beam forming processor circuitry configuration $19_{down}$ receives the various TCH/SACCHs that are de-multiplexed by circuit 17 and assembles them into multiplexed signals directed on 163 outputs to the spot beam antennas 18.

For signals on the uplink from the individual UTs to the SAN, the various transmissions are received by the spot beam antennas 18 and directed to processing circuitry $19_{up}$ which combines the various channels and passes them to the multiplexer configuration in circuit 17 for transmission through the antenna 16 to the SAN. It will be understood that the foregoing description of the satellite circuitry is schematic and for further details, reference is directed to GB-A-2 288 913 supra.

Figure 9:
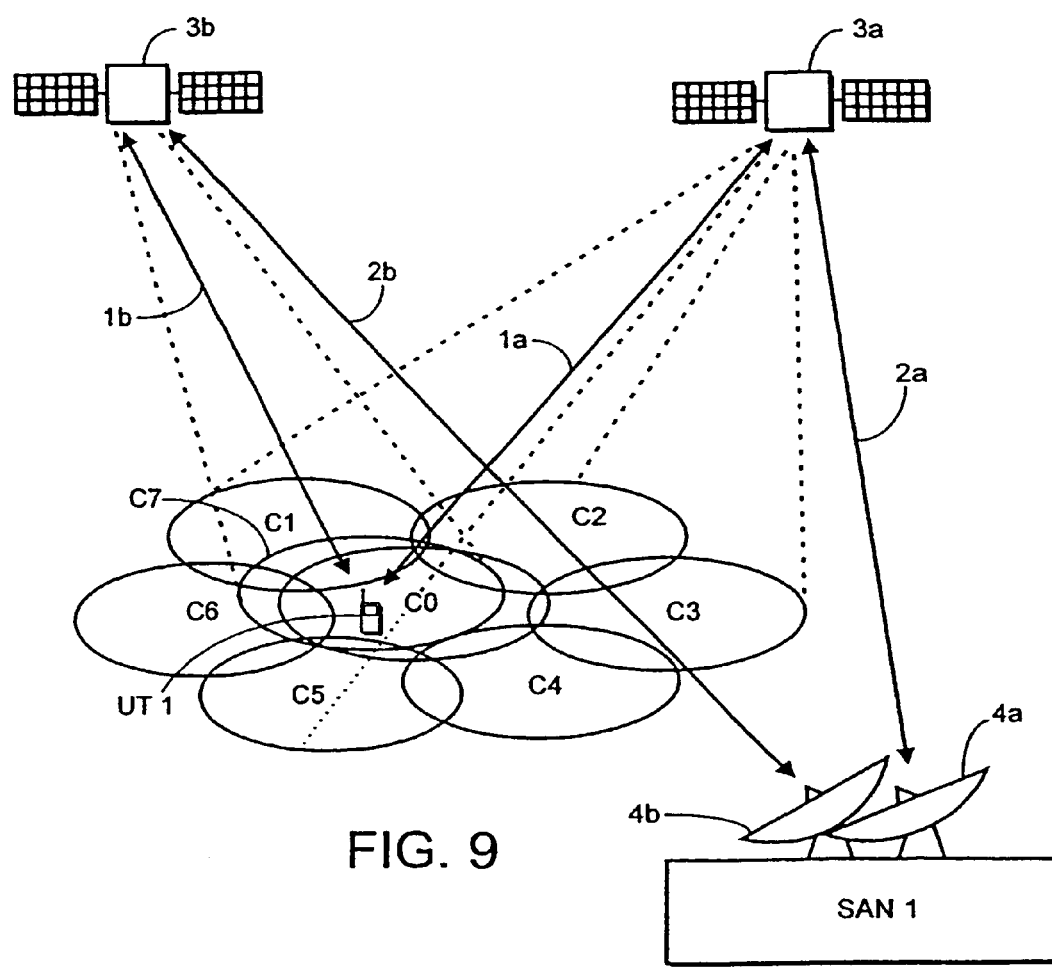
FIG. 9 is a schematic diagram of the cell pattern produced by the spot beams of satellites 3a, 3b.

An example of cells C0–C6 produced by the footprints of seven of the spot beams from antenna 18 of satellite 3a is shown in FIG. 9. Also, one of the spot beams from satellites 3b is shown, which produces cell C7. The other beam footprints are omitted for purposes of clarity. The diverse communication paths between SAN 1 and UT 1 are shown. As previously explained, one path 1a, 2a extends between antenna 4a and UT 1 via satellite 3a. The other path 1b, 2b extends between antenna 4b and UT 1 via satellite 3b. These diverse paths make use of cells C0 and C7 of the satellites 3a and 3b.

User terminal (UT 1)

Figure 10:
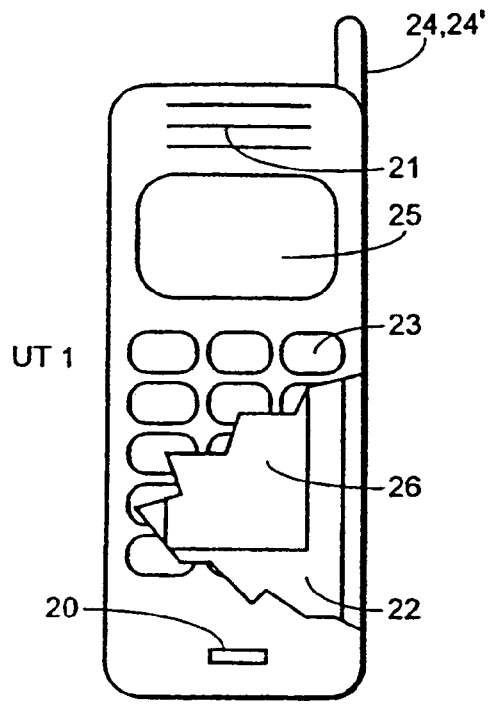
FIG. 10 is a schematic diagram of a mobile user terminal.
Figure 11:
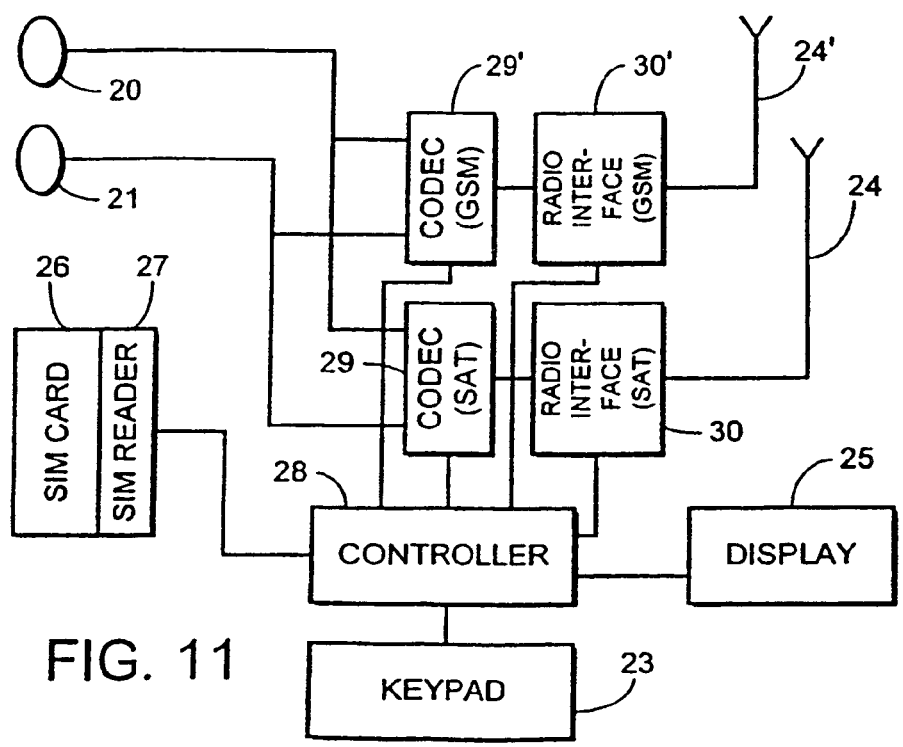
FIG. 11 is a schematic block diagram of the circuits of the user terminal shown in FIG. 10.

The mobile user terminal UT 1 is shown in more detail in FIGS. 10 and 11. It comprises a hand held device which is generally similar to a mobile telephone used for conventional terrestrial GSM networks. It is powered by a rechargeable battery and is configured to operate either with the local terrestrial cellular network or to roam to the satellite network. Thus, in the example shown in FIG. 3, the mobile handset UT 1 can operate either according to a land-based GSM protocol or according to the satellite network protocol. As shown in FIG. 10, the handset comprises a microphone 20, a speaker 21, a battery 22, a keypad 23, antennas 24, 24' and a display 25. The handheld unit UT 1 also includes a subscriber identification module (SIM) smartcard 26. The circuit configuration of the handset UT 1 is shown in block diagrammatic form in FIG. 11. The SIM card 26 is received in an SIM card reader 27 coupled to a controller 28, typically a microprocessor. The microphone and speaker 20, 21 are coupled to first and second codecs 29, 29' coupled to conventional radio interfaces 30, 30' connected to the antennas 24, 24' so as to transmit and receive communication signals, in a manner well known per se. The handset is capable of dual mode operation, with the codec 29, radio interface 30 and antenna 24 being used with the satellite network, and corresponding circuits 29', 30' and 24' being used with the GSM PLMN 9. Amongst other things, the controller 28 can monitor the quality of received signals from the satellite network, as will be explained in more detail later.

Satellite base station (SBS 1)

Figure 12:
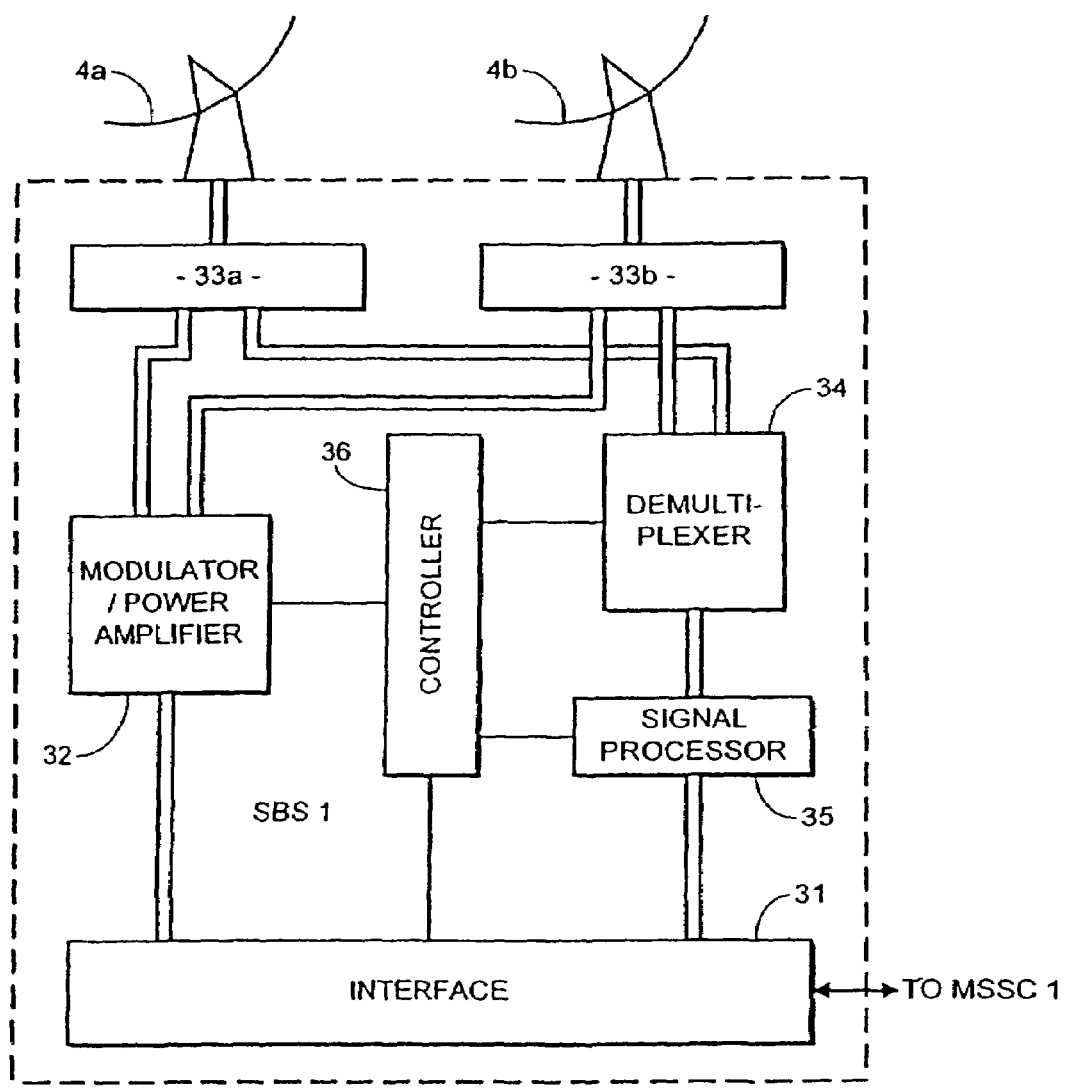
FIG. 12 is a schematic block diagram of SBS 1 shown in FIG. 3.

The configuration of the satellite base station SB1 at SNA1 will now be described in more detail with reference to FIG. 12. SBS1 comprises a network interface 31 providing an interface to MSSC 1, a modulator/power amplifier system 32, first and second feed units 33a, 33b for the dish antenna 4a, 4b, a demultiplexer 34, a signal processing unit 35 and a controller 36. As previously explained, SAN 1 may include five dish antennas and the connections for only two of them are shown in FIG. 12 in order to simplify the explanation.

The interface 31 receives communication signals from MSSC 1, routed from one of the various networks either through gateway GW 1 (FIG. 3) or via the backbone network 5. The interface 31 reformats the signals for transmission of the UTs. Several calls are simultaneously supplied to the modulator/power amplifier system 32 and an interleaved TCH/SACCH is produced under the control of controller 36. A number of TCH/SACCHs are produced concurrently on different frequency bands and are fed to either one or both of the antennas 4a, 4b for onward downlink transmission via the satellite to individual user terminals. The feed units 33a, 33b feed the signals to the antennas 4a, 4b.

The antennas also receive uplink signals form the satellites and each feed unit 33a, 33b includes power combiners for combining the signals from the modulator/power amplification system 32 and a circular for isolating the demultiplexer 34 from the combined signals and directing the combined signals to the respective antennas 4a, 4b.

Uplink signals received from the satellites are directed by the feed units 33a, 33b to the demultiplexer 34, which demultiplexes received uplink TCH/SACCHs and feeds the resulting signals via the signal processing unit 35 to the interface 31 for onward transmission to MSSC 1. The signal processing unit 35 extracts data from the received signals, which are fed to the controller 36 which in turn provides control data for UT 1, which is modulated by modulator 32 onto signals transmitted to the UT, as will be described in more detail later.

Service provision

The described network can provide service to subscribers in a number of different ways. For example, communication may be provided from UT 1 to UT 2 using the satellite backbone network 5. Alternatively, telephone communication can be established between the telephone set 7 and UT 1 either via SAN 1 and the satellite network, or, through PLMN 9, antenna 10 and link 11. For further description of service options, reference is directed to EP-A-0869628.

In the following, a telephone call established between telephone set 7 and UT 1 through SAN 1 and satellites 3a, 3b will be considered in more detail.

Radio link configuration

Figure 13:
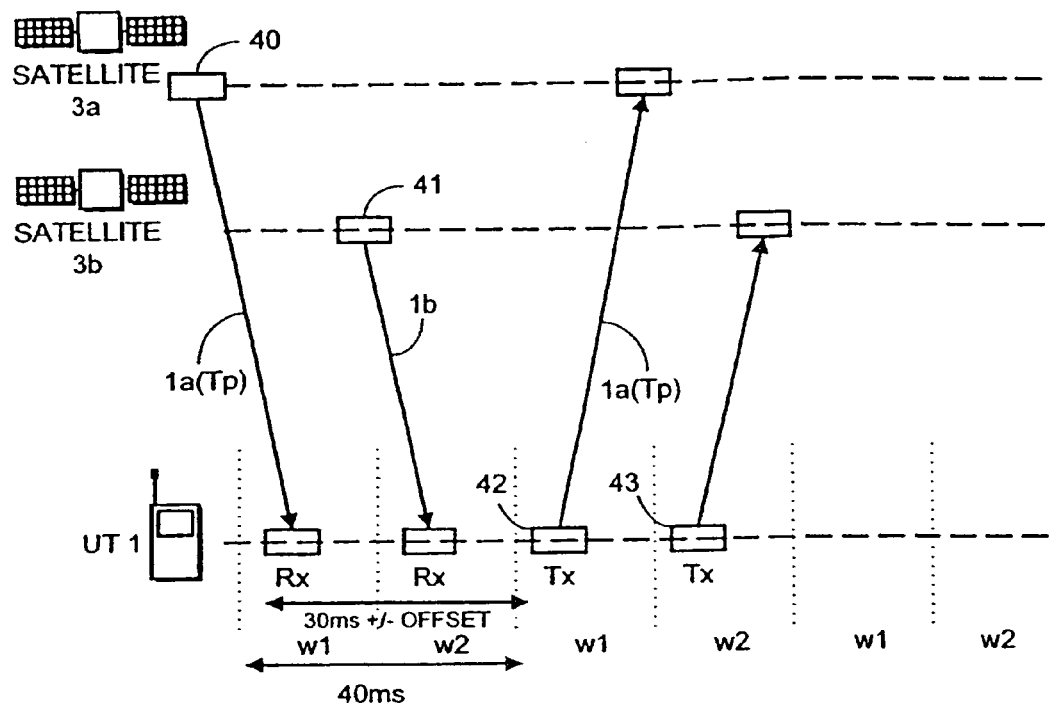
FIG. 13 is a schematic diagram of TDMA signals transmitted between the satellites and the user terminal.

Referring to FIG. 13, the TDMA frames which make up the TCH/SACCH, need to achieve synchronisation in order to achieve a satisfactory radio link between the SAN and UT 1. In the network described herein, link control is carried out referenced to each satellite, to ensure that integrity of the TDMA frame structure is maintained at the satellite, notwithstanding transmission delays to and from the satellite and Doppler shifts in frequency due to orbital motion of the satellite. It can be shown that choosing the satellite as the reference position reduces the overall complexity of the link control arrangements.

The issues associated with timing delays and Doppler shift will be considered in turn. Considering timing delays, for a terrestrial, cellular, mobile telephone network, the signal typically takes a few microseconds to travel from a base transmitter site antenna to a mobile station. Consequently, the transmitted TDMA time slot pattern is generally retained at the mobile station. A typical round trip delay for a 35 km cell is of the order of ¼ slot. However, in a satellite mobile telephone system with the satellites 3a, 3b in a medium earth orbit, the time taken for signals to travel between a satellite 3a, 3b and a UT 1 can be longer than a time slot. In the case of a satellite orbiting at 10390 km, the one way propagation time to the satellite's nadir (where the satellite is seen at an elevation of 90° on the Earth) is approximately 34.5 ms, which is comparable with the previously described 40 ms frame duration. This situation is further complicated by there being a significant difference between the path length to the cell at the nadir and the path lengths to the cells at the edge of the satellite's footprint. For a satellite orbiting at 10390 km, the one way propagation time to a UT which sees the satellite at 0° elevation is approximately 51.6 ms. This leads to significant differences in the times at which bursts arrive at UTs and in the times when UTs are required to transmit in order for their signals to fit in which the TDMA frame structure at the satellite.

As previously mentioned, the up and downlink traffic channel signals are to be nominally synchronised in timing and carrier frequency at the satellite. In relation to timing synchronisation, this means that path delay variations on links to individual UTs need to be compensated as will now be explained.

Referring to FIG. 13, the transmission of successive downlink TDMA bursts 40, 41 from satellites 3a,b over paths 1a,b, to UT 1 is shown together with uplink bursts 42, 43 from the UT to the satellites. The bursts in the example have a duration of 40/6 ms (6.667 ms) as previously discussed, and form part of the TCH/SACCH. At UT 1, each 40 ms frame N is defined as two 220 ms diversity windows w1, w2 for communication with the two satellites 3a,b. Considering the downlink burst 40 transmitted from satellite 3a, it is transmitted at a time determined by the synchronisation pattern that is maintained at satellite 3a, over path 1a to UT 1 and received within 20 ms reception window w1. A transmission delay $T_p$ occurs over the path 1a between the satellite 3a and UT 1. The user terminal UT 1 is configured to transmit an uplink burst 42 after a nominal, predetermined time delay D following reception of the downlink burst 40. The uplink burst 42 also is subject to the transmission delay $T_p$ as it travels to the satellite 3a. The time delay D needs to be selected so that the uplink burst 42 is received at the satellite 3a at a time which fits into the periodic pattern of the TDMA structure at the satellite 3a, in order to maintain synchronisation at the satellite. In this example, the time delay D is nominally 30 ms but is subject to an offset $\epsilon_t$, which may be a positive or a negative quantity, to account for variations in location of the UT, as will be explained hereinafter.

Communication between the satellite 3b and the user terminal UT 1 occurs in a similar way. The downlink TDMA burst 41 is received in diversity window w2 at UT 1 from satellite 3b over path 1b and the uplink burst 43 is transmitted to the satellite 3b by the UT after a delay D+$\epsilon_t$ so as to maintain synchronisation at the satellite 3b. Suitable values for $\epsilon_t$ for each satellite path are selected individually, as explained hereinafter.

Compensation to achieve the necessary synchronisation is carried out by referencing the timing for bursts transmitted on the path between the satellite and the UT to one of a number of different individual transmission delay values $T_o$ for which a zero offset $\epsilon_t$ is required. These different, individual transmission delay values map onto the surface of the Earth as arc-shaped contours Z as shown in FIG. 5. The location of the UT is considered in relation to one of these contours. When the UT is located on the contour, the timing delay corresponds to the individual value associated with the contour and the value of the timing offset $\epsilon_t$ needed is zero in order to maintain synchronisation of the uplink and downlink bursts at the satellite.

When the UT is positioned away from the contour, a timing offset $\epsilon_t$ is needed relative to the value at the contour, no compensate for the shorter or longer transmission path length between the satellite and the UT. Since the arc-shaped contours Z of constant time delay require, by diffusion, zero timing offset, the zero-offset arcs are referred to as Z-arcs.

In this example, each Z-arc delay value defines a path delay class which lies within ±1.4 ms of that value, so that 17 delay classes cover the 163 spot beams. FIG. 5 shows Z-arcs $Z_o$ superimposed onto the spot beam types. Beam types 0 to 5, for example, have a path wide delay variation of only 2.2 ms, and are therefore covered by a single Z-arc. In beam spots with more than one delay class, dotted arcs show the boundaries between delay classes.

Figure 14:
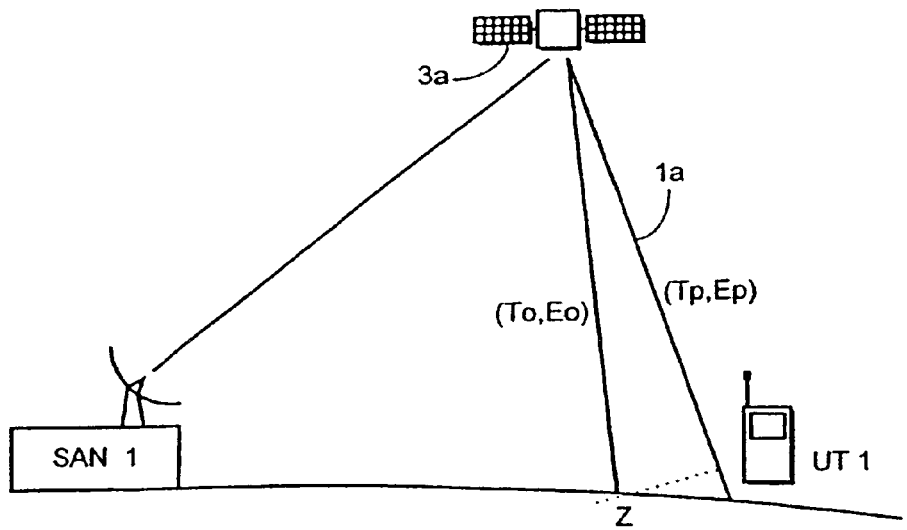
FIG. 14 is a schematic diagram showing the relationship of a transmission path between a user terminal and satellite, referenced to a Z-arc.

The relationship between the timing offset $\epsilon_t$, the path delay $T_p$ to the UT and the delay $T_o$ associated with an individual Z-arc can be seen from FIG. 14 which shows the transmission delays over the paths associated with the satellite 3a. It can be seen that the timing offset, when referenced to the Z-arc, is given by:

$$\epsilon_t = 2(T_p - T_o) \quad (1)$$

The factor of two deals with the fact that compensation is needed for both the uplink and the downlink path between the UT and the satellite.

The offset $\epsilon_t$, which, in this example has a maximum value of ±2.8 ms, can be calculated by SBS 1 and periodically sent to UT 1. The SBS 1 knows the Z-arc value corresponding to the delay class to which the UT 1 has been allocated. It can determine the delay between itself and satellite 3a by sending and receiving loop-back transmissions. Other delays within the system can be measured or details obtained from the relevant equipment manufacturer, for example, in the case of satellite transponder delays, from the satellite manufacturer, and this information supplied to the SBS 1. Since the SBS 1 knows the various offsets (i.e. the delay D and others) applied by the UT between the received and transmitted bursts, it can use a received burst from the UT to calculate the actual path delay between the SBS and UT 1.

The way in which a UT is allocated a traffic channel will now be described. UT 1 first acquires system time and frequency from a BCCH. To initiate radio access, UT 1 sends a channel request message by transmitting a formatted burst in a prescribed time slot on the RACH carrier frequency. As part of the contention resolution procedures required as a result of the use of a random access channel, the UT must be able to correlate a channel assignment from the network with its own request. For this purpose, part of the information content of the channel request message, for example five bits, is chosen randomly by the UT, which significantly reduces the probability that two UTs will send identical channel access request messages during the same slot.

SBS 1 searches for and acquires the UT RACH burst timing. As explained above, by knowing the received RACH time and various fixed offsets, the SBS can work out the actual path delay between the satellite 3a and the UT and therefore decide which Z-arc the UT should see, if the beam has more than one. The assignment of a traffic channel TCH/SACCH and initial pre-corrections are sent to the UT on the AGCH, together with the random reference initially sent by the UT and the absolute time slot number (ATN) at which the channel request message was sent. The random reference and ATN enable each UT receiving the AGCH to check that the channel assignment corresponds to its request.

During the traffic exchange on the TCH/SACCH, SBS 1 pre-corrects the downlink frame timing of the bursts transmitted from the SAN 1 to the satellite so that the bursts, on arriving at the satellite, achieve the desired synchronisation pattern, that results in zero frame timing offset on Earth along the Z-arc. The UT locks to the corresponding received burst timing from the satellite 3a and pre-corrects and transmits its uplink burst 30 ms±up to 2.8 ms later (D+$\epsilon_t$) so as to maintain nominally zero timing error at the satellite 3a. The SBS 1 periodically, for example, once per minute, sends new timing offsets to UT 1, based on continuing measurement of uplink burst timing at SBS 1. Thus referring to FIG. 12, the signal processor 35 measures timing errors in the received uplink bursts and based on this information, the controller 36 periodically encodes updated values of $\epsilon_t$ in SACCH$_{down}$ using modulator 32 for transmission to UT 1.

A similar process occurs for the link established through satellite 3b, between SAN 1 and UT 1, for diversity operation. The bursts of the TCH/SACCH sent through satellite 3b are subject to a corresponding pre-compensation process in which SBS 1 computes timing offsets relative to a Z-arc appropriate for satellite 3b. The timing offsets are transmitted to UT 1 and used by it to pre-compensate uplink bursts of the TCH/SACCH routed through satellite 3b. Downlink bursts from the SAN to the satellite 3b are pre-corrected relative to the Z-arc for satellite 3b and also to maintain synchronism of the delivery windows w1, w2 at UT 1 for the satellites 3a, 3b. The periodic updating process will be described in more detail hereinafter.

As previously mentioned, a Doppler shift occurs in the frequency of the bursts transmitted between each satellite 3a,b and UT 1, which unless corrected, can result in bursts shifting in the frequency domain from one allocated slot to another. Compensation in the frequency domain is carried out by defining Z-arcs of zero Doppler frequency offset and performing compensation at UT 1 and a SBS 1 in a similar manner as described herein for timing errors, but in respect of errors caused by Doppler shifts.

Diversity operation

As previously explained, a call established between SAN 1 and UT 1 can be routed via satellite 3a and satellite 3b over diverse paths 1a, 2a and 1b, 2b. The call can be routed over both paths concurrently to achieve diversity. This has the advantage that if one of the communications paths is subject to blockage or fading the other path can still provide good communication, thereby assuring a good signal quality.

The system described herein can operate in a number of different diversity modes including full diversity and partial diversity, which will be considered in more detail hereinafter. The link control process is configured to allow frequency and timing compensation to be performed whichever diversity mode is selected.

Full diversity mode

When in full diversity mode, a TCH/SACCH transmitted on the downlink from SAN 1 to UT 1 is concurrently transmitted over both of the paths 1a, 2a; 1b, 2b, both for the uplink and the downlink. Considering the downlink, a TCH/SACCH$_{down}$ is formed in the SBS 1 by the modulator/power amplifier system 32. Alternate TDMA frames which make up the TCH/SACCH are directed to the antennas 4a, 4b respectively via feed units 33a, 33b. The antennas feed the signal bursts on different frequencies to the satellites 3a, 3b respectively. For example, the TCH/SACCH for UT 1 uses one of the two TDMA slot pairs 0 and 3, 1 and 4 or 2 and 5 for the two diversity links.

Considering now operations at UT 1, TCH/SACCH$_{down}$ is received via the two satellites 3a, 3b in two frequency bands and the circuit shown in FIG. 11 receives these signals on antenna 24 and feeds them to the radio interface 30. The codec 29 assembles the bursts received in the two different frequency bands into a signal train which is then converted into an analog signal and fed to the speaker 21.

The controller 28 measures the bit error rate (BER) individually for the received TDMA bursts for each of the paths 1a, 1b from the satellite 3a, 3b. Also, the controller 28 measures the Doppler shift $\delta f_a$, $\delta f_b$ in the signals received from the satellites 3a, 3b and calculates the difference between them $\Delta f=(\delta f_a-\delta f_b)$. Furthermore, the controller 28 detects any timing errors $\delta t_a$, $\delta t_b$ for the TDMA bursts received on each of the two paths 1a, 1b from the satellites and calculates the difference between them $\Delta t=(\delta t_a-\delta t_b)$. This link control data LD ($\Delta f$ & $\Delta t$) is encoded, using codec 29 of UT 1 (FIG. 11) in the channel SACCH$_{up}$ associated with the uplink TCH$_{up}$.

In full diversity mode, the TCH/SACCH$_{up}$ is transmitted from UT 1 to SAN 1 via both satellites 3a, 3b and so the link control data in the SACCH$_{up}$ is received by the two dish antennas 4a, 4b and is directed to the demultiplexer 34 and signal processing unit 35.

As previously explained, the signal processor 35 monitors timing errors in the uplink bursts received via path 1a, 2a and based on this information, the controller 36 periodically instructs modulator 32 to send an updated value of timing offset $\epsilon_t$ for path 1a (satellite 3a) to UT 1 via the downlink SACCH$_{down}$. A corresponding updating of the Doppler offset $\epsilon_d$ for path 1a is carried out in a similar manner.

This updating process also needs to be carried out in respect of the timing offsets for path 1b (satellite 3b). The link control data LD transmitted in SACCH$_{up}$ is received by the processor 35 and used to compute updated values of offsets for path 1b, referred to herein as $\epsilon_t(b)$ and $\epsilon_d(b)$, based on the current value of the offsets $\epsilon_t,\epsilon_d$ for path 1a, referred to herein as $\epsilon_t(a)$ and $\epsilon_d(a)$, and differential data $\Delta t=(\delta t_a-\delta t_b)$ and $\Delta f=(\delta f_a-\delta f_b)$.

Controller 36 periodically instructs modulator 32 to encode the updated values of $\epsilon_t(b)$, $\epsilon_d(b)$, $\epsilon_t(a)$ and $\epsilon_d(a)$ in SACCH$_{down}$ link control data for the UT, to be transmitted to UT 1. The advantage of this updating method is that it is possible to continue to perform the updating process with respect to path 1b when propagation conditions are such that either path 1a or 1b degrade the reception of bursts from satellite 3b such that the burst cannot be used for deriving timing offset control.

It would also be possible to monitor the two uplink paths via the two satellites 1a, 1b separately.

Partial diversity mode

In this mode, the downlink channel TCH/SACCH$_{down}$ is transmitted to UT 1 from SAN 1 via both satellites 3a, 3b, as in the full diversity mode previously described. However for the uplink, TCH/SACCH$_{up}$ is transmitted via only one of the satellites 3a, 3b. This has the advantage of saving battery power at UT 1. The best uplink path is selected by consideration of the BER for the downlink channels individually, detected by controller 28 of UT 1 shown in FIG. 11.

thus in the partial diversity mode, only one uplink path is available and so the uplink paths cannot be independently monitored at the SBS to update the offsets $\epsilon_t(a)$, $\epsilon_d(a)$ and $\epsilon_d(b)$.

UT 1 is therefore configured to transmit link control data LD relating to both of the paths 1a, 1b, in one of the uplink paths to the SBS 1. Thus, for example if the path 1a through satellite 3a is selected for the partial diversity mode, the processor 35 at SBS 1 can monitor errors in the uplink and calculate the offsets $\epsilon_t$ (a), $\epsilon_d$ (a) accordingly. The values of $\epsilon_t$ (b) and $\epsilon_d$ (b) can then be calculated by the processor 35 as described above. Conversely, if satellite 3b is selected for the uplink, SBS 1 can monitor errors in this uplink an calculate the offsets $\epsilon_t$ (b), $\epsilon_d$ (b), from which $\epsilon_t$ (a) and $\epsilon_d$ (a) can be calculated using differential link data LD $\Delta t=(\delta t_a-\delta t_b)$ and $\Delta f=(\delta f_a-\delta f_b)$.

This arrangement thus has the advantage that link control data pertinent to both of the paths is determined by UT 1 and fed back on only one of the uplink paths via one satellite only. If the selected path for the uplink changes, no change is required to the configuration of the link control data which is configured to provide information about both of the paths and thus can be transmitted on either uplink path.

The described examples of diversity operation use two transmission paths. However, more paths can be used, i.e. the three or more. Thus, the delivery modes can be generalized to include m paths with an optional selection of n paths where m>n. It will be understood that the invention can also be applied to this generalised configuration.

Discontinuous Transmission (DTX)

As mentioned above, the performance of a mobile communication system can be improved by operating in DTX mode, to take advantage of the fact that speech is substantially discontinuous. In this mode, the TCH is not sent during voice pauses, but the $SACCH_{down}$ signal still needs to be sent to maintain link control, for example, to permit timing and frequency compensation to be performed as described above. In addition, as previously mentioned, silence descriptor (SID) frames are sent during voice pauses. The SACCH data can be transmitted fully in two pre-planned frame positions in each multiframe. However, when considered over all channels, this solution gives rise to significant peak power requirements and undesirable power ripple at the satellite. In accordance with the invention, alternative approaches which avoid this problem are described in detail below.

Figure 15:
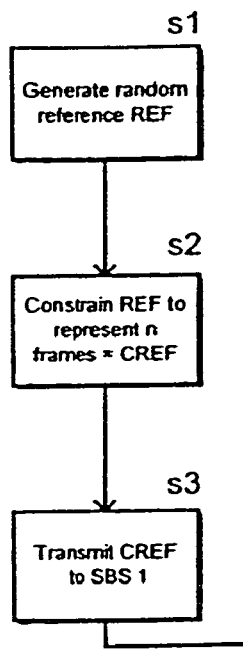
FIG. 15 is a flow diagram illustrating the operation of the SACCH multiplexing scheme.
Figure 15:
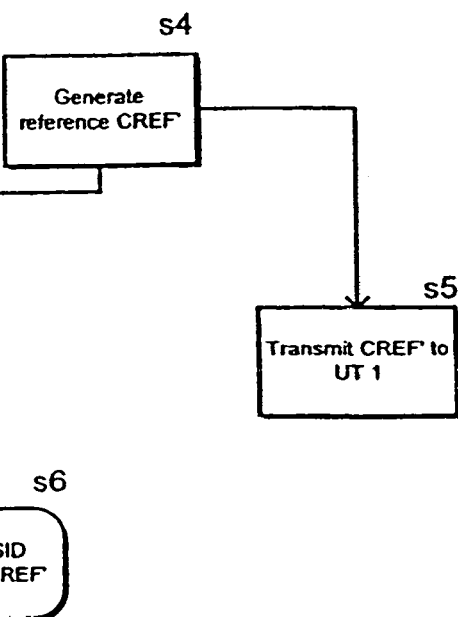

The way in which a UT is allocated a traffic channel when the DTX mode is to be used will now be described with reference to FIG. 15. As explained above, to initiate radio access, the UT 1 sends a random reference (REF) to SBS 1 as part of the channel request message. This reference can be used to determined initial multiplexing of the SACCH for all diversity paths. The SACCH frame assignments can be updated at handover or channel reassignment, or can be left as allocated at the initial assignment.

At the UT 1, at step s1, a random reference REF is first generated comprising y bits, for example 7 bits. At step s2, the UT controller 28 constrains a sufficient number of bits of the y-bit random reference REF to be in the range 0 to n-1, where n is the total number of frames over which the SACCH is to be distributed, to produce a constrained reference CREF. For example, where 12 frames are available for each SACCH block, n=12 and the 192 bits (16×12) of SACCH can be transmitted to arrive in a single frame at any one of frames 0 to 11 dependent on the constrained reference CREF.

For example, the least significant $\lceil \log_2(n) \text{ bits} \rceil$ of REF, where $\lceil x \rceil$ represents a rounding up of x, are constrained to provide the reference CREF. Assuming that n=12, then $\log_2(n) \approx 3.6$ and $\lceil \log_2(12) \rceil = 4$. Therefore, the least significant 4 bits of the y-bit reference REF are constrained at the UT controller 28 to represent the frame numbers 0 to 11 only.

At step s3, the UT 1 transmits the constrained reference CREF to the SBS 1. Instead of using the reference CREF provided by the user terminal, the reference CREF can alternatively be generated at SBS 1, and is referred to herein as CREF'. For example, referring to FIG. 15, at step s4, the SBS 1 generates a reference CREF' which is, for example, a number between 0 and n-1. At step s5, CREF' is transmitted by SBS 1 to UT 1 to inform UT 1 of the multiplexing scheme, so that it can subsequently correctly process SACCH data received from the SBS 1.

Figure 16:
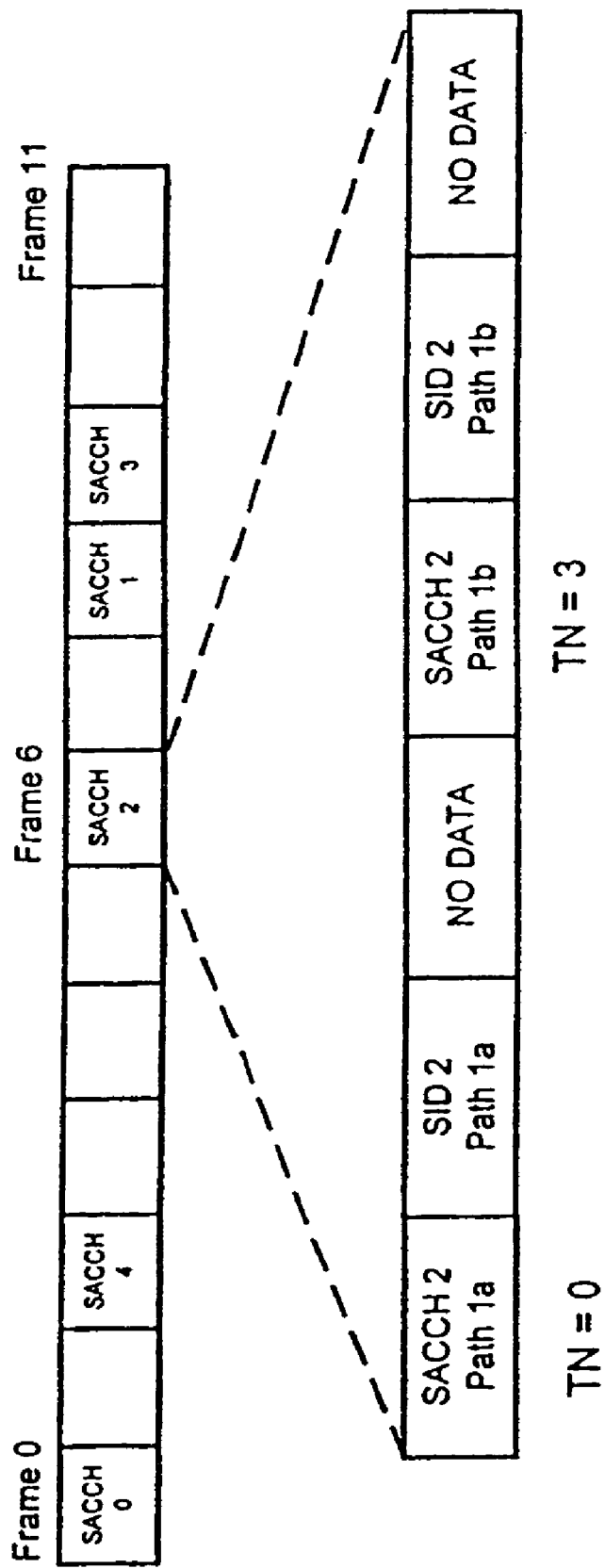
FIG. 16 is a schematic diagram showing the structure of the DTX signal in accordance with the invention.

At step s6, CREF/CREF' is used by SBS 1 to determine the transmission time of SACCH and SID blocks for each user terminal. As described previously, data bursts for diverse paths can be sent using time slot pairs. For example, FIG. 16 shows the first 12 frames of the resulting DTX signal structure where CREF/CREF' indicates that the SACCH data for UT 1, for example allocated to channel 2, is to be sent in frame 6, using diverse paths 1a, 1b, where data is to be transmitted in time slot TN=0 for diversity path 1a and time slot TN=3 for diversity path 1b. FIG. 16 also shows that the SACCH blocks for channels 0 to 5 are spread randomly throughout the multiframe. The SID bursts corresponding to the SACCH blocks are, for example, located in the same frame in the next available burst period.

Since a new random reference is provided for each UT and therefore each logical channel, the SACCH data is spread uniformly over the available slots thus decreasing the power ripple at the satellite when DTX is operational.

The reference used to determine burst transmission timing does not have to be truly random but could be pseudo-random or could be a predetermined sequence of numbers which serves to distribute the SACCH bursts over the available frames. It could also be chosen in dependence on existing power ripple at the satellite power bus.

While the SACCH multiplexing in accordance with the invention has been described specifically in relation to the DTC mode, this multiplexing scheme could also be used in non-DTX mode as an alternative method of providing a TCH/SACCH structure. In this case, SID frames are not transmitted and the TCH data is sent in slots not occupied by SACCH data.

The invention claimed is:

1. A method of data multiplexing in a mobile telecommunications system in which a ground station is in communication with each of a plurality of user terminals via a respective logical channel, each logical channel capable of carrying link control data to a respective user terminal over diverse communication paths using a multiple access scheme which include time division, in which a frame comprises a sequence of time slots, each time slot being associated with a logical channel, the link control data being sent in bursts in selected time slots, the method comprising:

for each channel, setting the data burst transmission time from the ground station such that data bursts carrying link control data relating to the same channel and traveling over diverse paths to the same user terminal, arrive at the user terminal within a predetermined number of frames, and distributing the ground station transmission time of data bursts carrying link control data for different channels over a plurality of frames, such that each frame which carries link control data includes link control data relating to a single logical channel only.

2. A method according to claim 1, comprising setting the data burst transmission time from the ground station such that data bursts carrying link control data relating to the same channel and traveling over diverse paths to the same user terminal, arrive at the user terminal within the same frame.

3. A method according to claims 1 or 2, comprising setting the ground station burst transmission time in accordance with transmission control information (CREF) provided by the user terminal.

4. A method according to claim 3, comprising sending the transmission control information in a channel request message from the user terminal to the ground station.

5. A method according to claims 1 or 2, including setting the ground station burst transmission time in accordance with transmission control information (CREF) provided at the ground station.

6. A method according to claim 3, wherein the transmission control information comprises information relating to the frame number at which the control data is to be transmitted.

7. A method according to claim 1, comprising setting the data burst transmission time irrespective of the time slot number TN.

8. A method according to claim 1, wherein the transmission control information comprises a random reference (CREF, CREF') constrained to the number of frames over which the control data can be multiplexed.

9. A method according to claim 1, wherein the link between the user terminal and the ground station operates in a discontinuous transmission (DTX) mode.

10. A method according to claim 1, comprising initiating the transmission of the control data from the ground station to the user terminal over diverse paths.

11. A method according to claim 1, wherein the mobile telecommunications system comprises a satellite system.

12. A method according to claim 1, comprising distributing the ground station data burst transmission time so as to achieve a substantially uniform distribution of data bursts over the available frames.

13. A method according to claim 1, comprising distributing the ground station data burst transmission time so as to achieve a substantially random distribution of data bursts over the available frames.

14. A method of data multiplexing in a mobile telecommunications system in which a ground station is in communication with each of a plurality of user terminals via a respective logical channel, each logical channel capable of carrying link control data to a respective user terminal over diverse communication paths using a multiple access scheme which includes time division, in which a frame comprises a sequence of time slots, each time slot being associated with a logical channel, the link control data being sent in bursts in selected time slots, the method comprising:

for each channel, setting the data burst transmission time from the ground station such that data bursts carrying link control data relating to the same channel and traveling over diverse paths to the same user terminal, arrive at the user terminal within a predetermined number of frames, and distributing the ground station transmission time of data bursts carrying link control data for different channels substantially randomly over a plurality of frames.

15. A method according to claim 14, comprising setting the data burst transmission time from the ground station such that data bursts carrying link control data relating to the same channel and traveling over diverse paths to the same user terminal, arrive at the user terminal within the same frame.

16. A method according to claim 14, comprising setting the ground station burst transmission time in accordance with transmission control information (CREF) provided by the user terminal.

17. A method according to claim 16, comprising sending the transmission control information in a channel request message from the user terminal to the ground station.

18. A method according to claim 16, wherein the transmission control information comprises information relating to the frame number at which the control data is to be transmitted.

19. A method according to claim 16, wherein the transmission control information comprises a random reference (CREF, CREF') constrained to the number of frames over which the control data can be multiplexed.

20. A method according to claim 14, including setting the ground station burst transmission time in accordance with transmission control information (CREF) provided at the ground station.

21. A method according to claim 14, comprising setting the data burst transmission time irrespective of the time slot number TN.

22. A method according to claim 14, wherein the link between the user terminal and the ground station operates in a discontinuous transmission (DTX) mode.

23. A method according to claim 14, wherein the step of distributing substantially random includes using a pseudo-random distribution.

24. A method according to claim 14, wherein the step of distributing substantially randomly includes using a predetermined sequence of numbers which serves to distribute the link control data over the available frames.

25. A link control signal for maintaining link control between a user terminal and a ground station in a mobile telecommunications system in which a ground station is in communication with each of a plurality of user terminals via a respective logical channel, each logical channel capable of carrying link control data to a respective user terminal over diverse communication paths using a multiple access scheme which includes time division, in which a frame comprises a sequence of time slots, each time slot being associated with a logical channel, the link control data being sent in bursts in selected time slots, the signal being configured such that data bursts carrying link control data relating to the same channel arrive at the user terminal within a predetermined number of frames, and such that data bursts carrying link control data for different channels are distributed over a plurality of frames, such that each frame which carries link control data includes link control data relating to a single logical channel only.

26. A signal according to claim 25, wherein the signal is configured such that data bursts carrying link control data relating to the same channel arrive at the user terminal within the same frame.

27. A user terminal for use in a mobile telecommunications system in which a ground station is in communication with each of a plurality of user terminals via a respective logical channel, each logical channel capable of carrying link control data to a respective user terminal over diverse communication paths using a multiple access scheme which includes time division, in which a frame comprises a sequence of time slots, each time slot being associated with a logical channel, the link control data being sent in bursts in selected time slots, the user terminal comprising means for providing transmission control information to the ground station to control the setting of data burst transmission times at the ground station, in dependence on which data burst transmission times are set at the ground station such that data bursts carrying link control data relating to the same channel and traveling over diverse paths to the same user terminal, arrive at the user terminal within a predetermined number of frames, and such that the ground station transmission time of data bursts carrying link control data for different channels is distributed over a plurality of frames, such that each frame which carries link control data includes link control data relating to a single logical channel only.

28. A user terminal according to claim 27, wherein said transmission control information comprises a randomly generated reference.

29. A user terminal according to claim 27, wherein said transmission control information is a subset of a reference generated for contention resolution of requests on a random access channel.

30. A user terminal according to claim 29, wherein said subset comprises the randomly generated reference constrained to the number of sending opportunities.

31. A ground station in a mobile telecommunications system in which the ground station is in communication with each of a plurality of user terminals via a respective logical channel, each logical channel capable of carrying link control data to a respective user terminal over diverse communication paths using a multiple access scheme which includes time division, in which a frame comprises a sequence of time slots, each time slot being associated with a logical channel, the link control data being sent in bursts in selected time slots, the ground station comprising means for setting data burst transmission times in dependence on transmission control information (CREF, CREF'), such that data bursts carrying link control data relating to the same channel and traveling over diverse paths to the same user terminal, arrive at the user terminal within a predetermined number of frames, and such that the ground station transmission time of data bursts carrying link control data for different channels is distributed over a plurality of frames, such that each frame which carries link control data includes link control data relating to a single logical channel only.

32. A ground station according to claim 31, wherein the predetermined number of frames comprises a single frame.

33. A ground station according to claim 31, wherein the transmission control information is provided by a user terminal (CREF) or generated at the ground station (CREF').

* * * * *